United States Patent
Ganesh et al.

(10) Patent No.: US 8,200,771 B2
(45) Date of Patent: Jun. 12, 2012

(54) WORKLOAD MIGRATION USING ON DEMAND REMOTE PAGING

(75) Inventors: Perinkulam I. Ganesh, Round Rock, TX (US); David A. Hepkin, Austin, TX (US); Vinit Jain, Austin, TX (US); Rajeev Mishra, Kamataka, IN (US); Mark D. Rogers, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 12/249,720

(22) Filed: Oct. 10, 2008

(65) Prior Publication Data

US 2010/0094948 A1   Apr. 15, 2010

(51) Int. Cl.
*G06F 15/167* (2006.01)
(52) U.S. Cl. ...................................... 709/212; 709/223
(58) Field of Classification Search .................. 709/212, 709/223, 225–230, 238
See application file for complete search history.

(56) References Cited

U.S. PATENT DOCUMENTS

| | | | | |
|---|---|---|---|---|
| 5,459,864 A * | 10/1995 | Brent et al. | .................... | 718/105 |
| 5,978,829 A * | 11/1999 | Chung et al. | .................. | 718/102 |
| 6,105,148 A * | 8/2000 | Chung et al. | .................... | 714/16 |
| 6,526,447 B1 | 2/2003 | Giammaria | | |
| 6,546,404 B1 * | 4/2003 | Davis et al. | ........................... | 1/1 |
| 6,718,435 B2 * | 4/2004 | Riedle | ............................ | 711/114 |
| 6,854,115 B1 * | 2/2005 | Traversat et al. | .................. | 718/1 |
| 6,934,755 B1 * | 8/2005 | Saulpaugh et al. | ............ | 709/226 |
| 7,251,747 B1 | 7/2007 | Bean et al. | | |
| 7,281,108 B2 | 10/2007 | Todd | | |
| 7,293,161 B1 * | 11/2007 | Chaudhry et al. | .............. | 712/216 |
| 7,933,991 B2 * | 4/2011 | Ganesh et al. | ................. | 709/225 |
| 2006/0184587 A1 | 8/2006 | Federwisch et al. | | |
| 2007/0294578 A1 * | 12/2007 | Qiao et al. | ........................ | 714/17 |
| 2009/0327807 A1 * | 12/2009 | Varadarajan et al. | ............. | 714/15 |

OTHER PUBLICATIONS

Kharat, Satish, et al., "Migration of Software Partition in UNIX System," Proceedings of the 1st Bangalore Annual Computer Conference, 2008, 4 pages.

* cited by examiner

*Primary Examiner* — Faruk Hamza
(74) *Attorney, Agent, or Firm* — Francis Lammes; Stephen J. Walder, Jr.; Libby Z. Toub

(57) ABSTRACT

In one embodiment a method for migrating a workload from one processing resource to a second processing resource of a computing platform is disclosed. The method can include a command to migrate a workload that is processing and the process can be interrupted and some memory processes can be frozen in response to the migration command. An index table can be created that identifies memory locations that determined where the process was when it is interrupted. Table data, pinned page data, and non-private process data can be sent to the second processing resource. Contained in this data can be restart type data. The second resource or target resource can utilize this data to restart the process without the requirement of bulk data transfers providing an efficient migration process. Other embodiments are also disclosed.

20 Claims, 5 Drawing Sheets

WORKLOAD MIGRATION USING ON DEMAND REMOTE PAGING

BACKGROUND OF THE DISCLOSURE

The present disclosure relates generally to computers. More particularly, the present disclosure relates to migrating a processing workload between different substantially identical hardware resources in a virtualized computing system.

Large computing platforms that are at the core of data centers and cluster configurations provide large database services, large web hosting services, large gaming services, virtual environments, enterprise management systems for governments, businesses, etc., are becoming more common. International Business Machine (IBM) continues to provide innovative solutions for these large computing platforms. A good computing system is not only robust but is easily maintainable. It can be appreciated that not all components of a server can be hot swapped. Thus, to provide maintenance on a piece of hardware acting as a server on a platform, at multiple times during its life the server must be removed from the platform for such servicing. To remove the piece of hardware from the platform without disrupting service, it is desirable to seamlessly move the processes operating on the hardware to a target piece of hardware. The alternate piece of hardware can be an alternate server or a target server where the target server can continue the process. After the hardware is removed from service problem solving, maintenance such as adding improvements and upgrading and replacing the entire server with a newer more advanced model can be achieved.

On current systems a hypervisor and other firmware can be utilized to create logical partitions (LPAR) where different LPARS can operate different operating systems. One feature that can facilitate a processes of moving a workload or a workload partition from hardware resource to hardware resource is code that is set up to operate as a workload partition. Accordingly an LPAR can be broken up into multiple WPARSs.

In some systems, workload partitions can be moved from resource to resource to further increase the efficiency of a large processing complex. This mobility of workload partitions (WPARs), was first made available in IBM operating system. The AIX® system is a name given to a series of proprietary operating systems based on a Unix OS sold by IBM, for several of its computer system platforms. Generally, mobile WPARs are WPARs that have characteristics that allow the workload partition to be moved or migrated from physical machine to physical machine, or from a source machine to a target machine.

AIX workload partitions (WPAR)s can be defined as operation of multiple virtualize operating systems that are operating within a single copy of the AIX operating system. As seen by most applications, each workload partition appears to be a separate instance of the AIX operating system. Such an appearance can occur within the partition, because the applications can have a private execution environment. The applications can be isolated in terms of process, signal and file system. Further, applications can have their own unique users, groups, and dedicated network addresses. Interprocess communication can be restricted to processes executing in the same workload partition. Accordingly, a WPAR can be transparent as most applications are unaware of the software creating the workload partition and thus most application can run, unmodified in a WPAR. In addition, workload partitions can be integrated with AIX resource controls and it can be possible to assign central processing unit (CPU) and/or memory shares to a WPAR. Yet further, workload partitions can establish limits on threads and processes.

As implied above, there are many advantages in migrating operating system instances across distinct physical hosts in data centers, clusters, etc. For example, workload migration allows a clean separation or isolation between hardware and software and facilitates fault management, load balancing, and low-level system maintenance. Carrying out migration while OSs continue to run provides a system administrator of data centers and cluster environments with a very useful tool, as long as there is only minimal interruption or minimal downtime. Live migration is very desirable and provides a practical tool for servers running interactive loads, for example, by moving a workload to different servers a hardware problem can be isolated to a particular server if faults only occur on a particular server.

BRIEF SUMMARY OF THE DISCLOSURE

A method for migrating a workload from one processing resource to another processing resource of a computing platform is disclosed. The method can include a command to migrate a workload that is processing and interrupting the execution of the process. Memory locations can be frozen in response to the migration command. An index table can be created that identifies memory locations that determined where the process is at when it is interrupted. The target resource can be provide with indicators of where the data is located that is required to restart the process thus no bulk data transfers are required to migrate the process. Other embodiments are also disclosed.

In other embodiments, pinned pages resulting from the suspension of the process can be located and indications of the pinned pages can be accessible by the target system. Data in memory that has special characteristics, such as non-private process data. Non-private process data can be kernel generated data and/or instructions such as data process tree, file descriptor information, TTY compatible data, checkpoint data, STREAMS or checkpoint data to name a few.

Checkpoint data can be directly transferred overt the network to the target system and the checkpoint data can provide minimal amount of instruction to restart the process on the target entity. In some embodiments, locations in memory can have fixed indexes where a memory location is mapped to one or more index. Utilizing a network file transport system, a minimum number of pages of data can be moved to the target processing resource, and the balance of the data can be moved to the target resource as the target resource generates page faults, that in turn can request and retrieve data. A local or remote paging device can be utilized to provide data to the target resource.

In yet another embodiment, a system is disclosed that includes a processor that can process an application as part of a first processing system memory and can store data related to the application to memory. A direct transfer protocol module can be utilized to create a migration request and the processor can suspend processing of the application in response to the migration request. The target processing system can be activated and a check point module can create check point data based on a state of the suspended process. The check point data can be communicated to the target processing system and a file transport system can be utilized to move data related to the application from the first processing system to the target processing system as the target processing system restarts the application.

In yet other embodiments, an input output module can convey the check point data to the target processing system and the input output module can be a paging device of a file transport system. The input output module can convey pages of data to the target resource based in a data retrieval request from the target processing system. A translation table can associate a request from the target processing system with a location in the memory to provide requested data to the target processing system. A direct transfer protocol module can facilitate a transfer of the check point data from the first processing resource to the hardware target resource. In some embodiments, virtual real memory and a virtual memory manager can be coupled to the virtual real memory, and the virtual memory system can utilize an external page table to locate data related to the first processing resource and the application.

In yet another embodiment, a machine-accessible medium containing instructions to operate a processing system which, when the instructions are executed by a machine, cause said machine to perform operations is disclosed. The medium can include instructions that interrupt the execution of processes and freeze memory locations. In response to the instructions an index table can be created that identifies memory locations that determined where the process is when interrupted. The target resource can be provide with indicators of where the data is located that is required to restart the process thus no bulk data transfers are required to migrate the process. Other embodiments are also disclosed.

BRIEF DESCRIPTION OF THE DRAWINGS

Aspects of the disclosure will become apparent upon reading the following detailed description and upon reference to the accompanying drawings where like references may indicate similar elements.

DETAILED DESCRIPTION OF EMBODIMENTS OF THE DISCLOSURE

The following is a detailed description of novel embodiments depicted in the accompanying drawings. The embodiments are in such detail as to clearly communicate the subject matter. However, the amount of detail offered is not intended to limit anticipated variations of the described embodiments but on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art. While specific embodiments will be described below with reference to adapters, components, circuits or logic configurations, those of skill in the art will realize that embodiments of the present disclosure may advantageously be implemented with other components and configurations.

There has been a recent increase in the demand for virtualization of computing platforms. One reason that this has occurred is because businesses, such as those that operate large computing platforms supporting Internet processes and data service businesses serving other businesses, cannot keep up with the processing demands of new clients, growing clients, and new applications. Virtualization of a computing platform, or even a server, can add processing capacity to an existing platform. Virtualization of a platform is a much more efficient to adding processing capacity than adding new hardware, such as additional memory and/or additional servers. It can be appreciated that most datacenters are already overstretched in terms of server count, floor space, electricity consumed and heat generated per square foot of raised floor space, thus increasing the computing capacity for existing hardware is a very efficient way to improve efficiency and profits.

It can also be appreciated that virtualization of a computing platform can reduce server count by increasing the utilization efficiency of the computing platform and lowering the operating cost of such platforms. Virtualization is also an excellent solution to the problem of overwhelming demand for processing resources. Virtualization technologies can include the functions of a hypervisor, hardware partitioning, logical partitioning, virtualized memory management and in accordance with the arrangements herein, migration of workload partitions.

One advantage of a virtualized computing platform is that workloads can be migrated from one piece of hardware to another piece of hardware or from a source to a target. As stated above, workload migration in a computing platform provides many advantages. A clean separation or isolation between hardware and software facilitates can facilitate fault detection, fault management, load balancing, high level and low-level system maintenance, etc.

Figure 1:
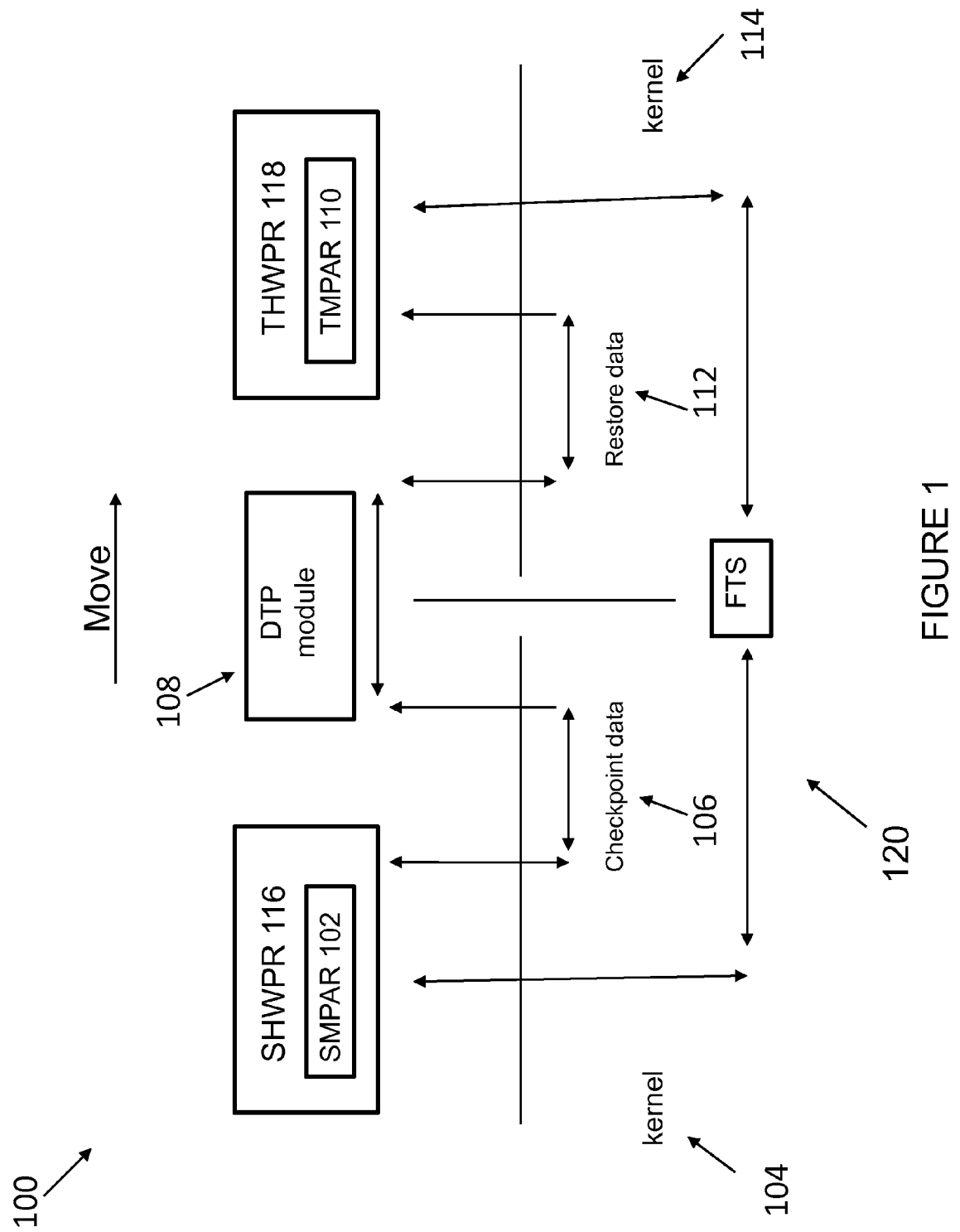
FIG. 1 is a diagram of a moving a workload from a source processing resource to a target processing resource.

Referring to FIG. 1 a diagram illustrating a platform 100 for moving a source mobile partitioned workload (SMPAR) 102 from a source hardware resource (SHWPR) 116 to a target mobile partitioned workload TMPAR in a target hardware processing resource (THWPR) 118. FIG. 1 depicts generally a migration of a workload or a set of processes from one hardware processing resource to another hardware processing resource.

The platform 110 can generally include the SHWPR 116, the THWPR 118, a direct transfer protocol (DTP) module 108 to control the migration and a network file transport system or just file transport system (FTS) 120. The DTP 108 can assist in transferring data such as indexes and tables that indicate where the processes were in the code when the migration process interrupted the applications. The NTS 120 can then facilitate actual data transfer as the THWPR 118 needs data and information to continue execution of the migrated process.

The term data and information are used synonymously and interchangeably herein. Data and information, as the terms are utilized herein, include instructions, commands, application data, application context data, raw data, processed data, etc., wherein the word data, as utilized herein, includes any binary sequences. The FTS 120 can include paging devices, block devices storage devices, block I/O devices, and can include any device(s) which the platform 100 utilizes to move data in discrete dimensions, such as pages or blocks. When a block device operates as a node or a logical unit, it can be assigned an address, a physical address, a logical address or a logical unit number. A block I/O device can often support random access and seeking, and generally use block buffered inputs and outputs.

It can be appreciated that the DTP 108 can facilitate movement of a minimum amount of data and such minimal data can be utilized to restart the process on the THWPR 118. Migration of a workload with such minimal data movement provides significant improvements over traditional migration processes/systems that require much more time and memory to migrate the workload. Moving such huge volumes of data, or huge files including application instructions from location to location as part of a migration process can be viewed as a similar to a "back-up" process that can take a significant amount of time.

In operation, the DTP 108, either automatically or as controlled by a user, can send a migration command to SHWPR 116. SHWPR 116 can receive the migration command and, in response to the command, the SHWPR 116 can suspend operations of one or more processes. The operations may have preferred locations in their operations to suspend processing and enter into a check point mode.

As part of the check pointing process, the OS kernel 104 running on the SHWPR 116 can create a transition-translation table that includes checkpoint data 106 that reflects where the OS and its application are in the execution of a process, or where in the code the process has been interrupted or suspended. The check point data 106 can include indexes and non-private process data that is part of the process and present when the process is suspended. The checkpoint data 106 can be sent directly to the THWPR 118 via the DTP 108 and its associated commands, and when this data reaches the THWPR 118 the data can be considered restore data 112 by the THWPR 118.

The OS and kernel 114 can be loaded onto the THWPR 118 and responsive to commands from the DTP 108, can receive and load indexes and can utilize the checkpoint data to restart the processes. If, or when the THWPR 118 needs data it can request and retrieve data from memory locations per the FTS 120 where data can come from virtual real memory. Thus, via tables and logical addresses, the THWPR kernel 114 can find memory locations where processing results from past processing of the SHWPR 116 have been stored.

Such preparation for migration as part of the checkpoint process can include generating the transition-translation table which can include an offset or index, a segment and a page number. Such a table can be utilized to retrieve instruction and data in memory where the application is restarted. Some migration commands from the DTP 108 can start the OS(s) and its kernel 114 and applications on the THWPR 118. The OS of the THWPR 118 should be the same or a similar OS that was operating and interrupted on the SHWPR 116.

When the SHWPR 116 is running on system 102, the pages of data for various processes can be placed in real memory or in virtual memory and such pages can be backed up to a local paging device. When migration is commenced, the processes can be put in a frozen state and the state of the processes and their results can be check pointed. In some embodiments it is desired that during the check pointing process that that certain memory processes be frozen preventing new pages from being created by any system or process and by disallowing pages to be deleted. Allowing such activities could result in data loss.

However, a virtual memory manager page replacement process could still operate on the frozen pages. After freezing the page, the DTP 108 can start the check pointing of the various pieces of the SMPAR 102. Non-private process data like process tree, file descriptor information, serial data such as TTY type data, checkpoint data, STREAMS checkpoint data, etc., can be transferred directly to the TMPAR 110. The non-private process data could be sent directly to the TMPAR 110 as a file transfer function. Although many embodiments below discuss paging, page space, blocks, etc., the disclosed embodiments are not limited to any particular dimension such as a logical volume defined by a page. The term page and page space as utilized herein are intended to mean any fixed size logical dimension or logical volume of data that data can be divided into. Hence, the term page is utilized synonymously with any segment size of data.

The FTS can provide applications with the ability to create alternate data streams for transmitting and receiving data. In some embodiments "all" data can be stored in a file's main unnamed data stream. However, by utilizing the command or syntax "file:stream," the file transport system can read and write utilizing alternates file streams in the system. It can be appreciated that not all applications are written to be able to utilize alternate streams, but alternate streams can be utilized in the migration process when such capabilities are available.

It is anticipated, that the majority of the checkpoint data will be process private data and thus the majority of the data required to restart the process can be moved to the TMPAR 110 prior to the restart. Process private data can include data located in the process private heap, the stack, and memory-mapped regions, etc., and it can be appreciate that the "exact" data need not be retrieved, captured and moved to migrate a process but only indexes (and other check point data) needs to be moved in order to restart the process. In some embodiments, only the segment and page number information for the page of data where executions were suspended needs to be check pointed and transmitted for each process. Moving a process with such a small amount of data provides significant benefits over all know traditional process migrations. As each process is check pointed, the segment and page number information can be stored in a transition-translation table and send by paging to provide an easy start up for the THWPR 118.

The process of storing the translation in the table for a transition of a workload from one piece of hardware to another can provide an index that is an association between what data is needed and where the data is located in the memory system. The index, which is also referred to herein as an offset, can indicate a segment and page number (i.e. a memory location) where the desired data is stored. The index can be passed across along with the segment and page number information to the TMPAR 110 and the index can be utilized during the restart process and after the process is restated as the data is needed until data in the old indexed locations is obsolete or no longer needed.

In some embodiments, a single transition-translation table can be created for each SHWPA 116. The FTS 120 can "front end" the transition-translation table to provide an efficient start up. The file can be generated in accordance with the NFS 120 and in accordance with other file system protocols that cater to migrating a workload. One such file system is portioned memory file system or (PmemFS). Accordingly, a PmemFS can facilitate communicating the transition-translation table file from the SHWPR 116 to the THWPR 118 via the NFTS 120. The PmemFS based files can be mounted as a remote network file system and can operate like the NFS 120 shown by utilizing a paging device on the THWPR 118 to transfer data. The process image, as interrupted, can be recreated on the THWPR 118 as part of the TMPAR 110, and the pages can be marked as "paged out" to the FTS 120 where the FTS controls a remote paging device. A page fault can occur when the OS cannot locate a page in local memory. Such marking can create a call to virtual memory for the needed data. The external page table can contain indexes referencing a paging device and offsets.

Part of the file transport system can include transactions with virtual memory, and a virtual memory manager. The virtual memory manager can include a strategy routine for locating data and instructions requested by the THWPR 118. When a page fault occurs, the strategy routine can pass the offset and page size to a network file system swap device. The NFS 120 can send the information across on or more busses to the PmemFS file. The PmemFS can look into the transition-translation table and retrieve data utilizing the offset provided. The system can read the segment and page information and attach the segment and page information to the segment and offset, and retrieve a page worth of data and send it to the THWPR system 118.

The disclosed arrangements can be describe generally as moving a bunch of processes from one operating system on a first source machine to another "identical" or compatible operating system operating on a target or back-up machine. Thus, in some embodiments and from a high level perspective operating systems are not moved from hardware resource to hardware resource.

In some embodiments, the virtual input output server can partition the virtual real memory into logical volumes such as pages that are efficiently handled by the virtual real memory stack and paging space or devices. In some embodiments, the OSs and applications can be granted use of one or more logical units such as disk storage in block storage devices by a storage area network administrator. The virtual I/O server in cooperation with other devices can assign a shared logical unit number (LUN) to paging devices providing services for a particular client or OS. The LUN can be utilized for addressing purposes. A paging space manager as part of paging space can interact with virtual memory manager to create such paging space and access to such paging space.

Figure 2:
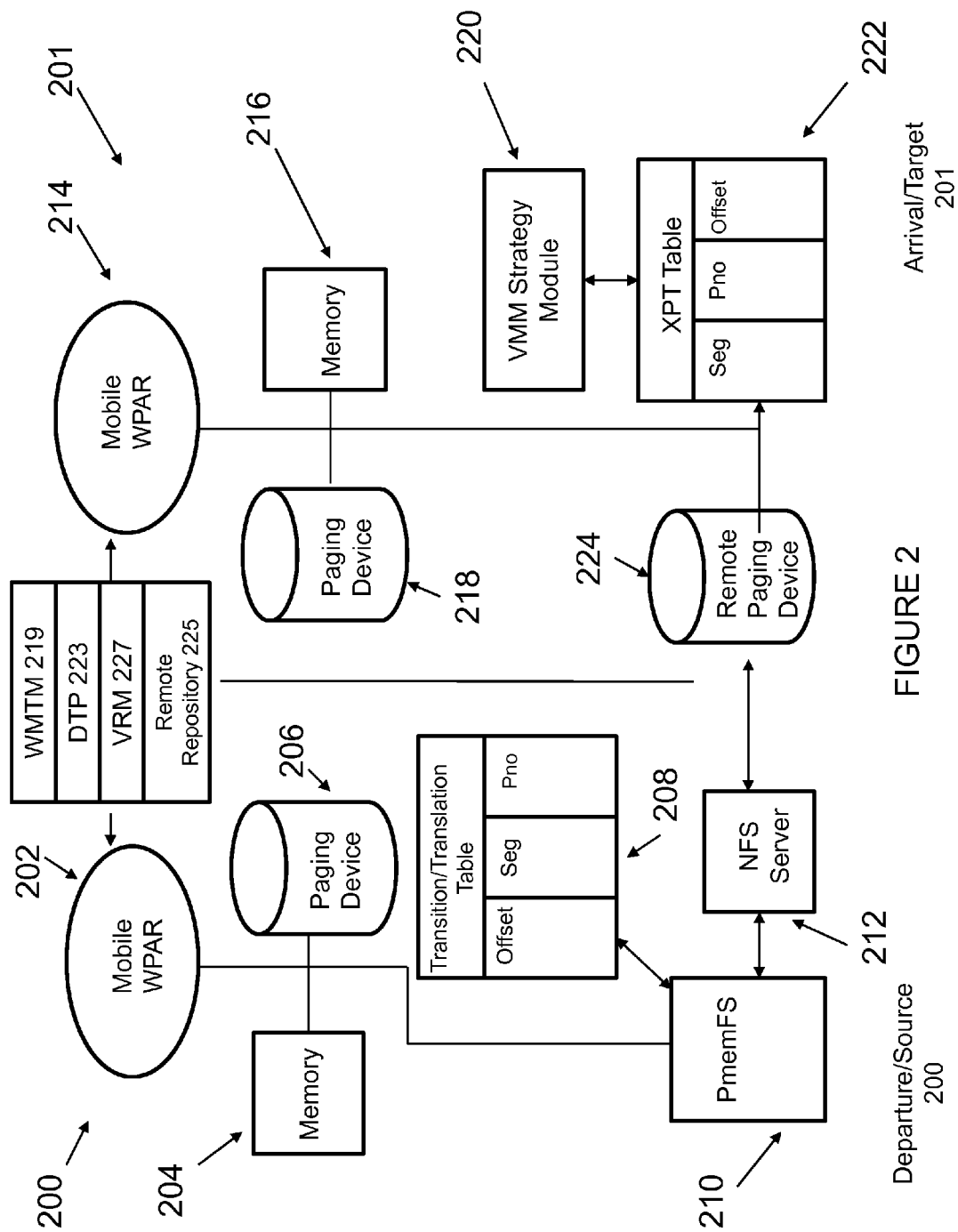
FIG. 2 is a more detailed diagram of moving a workload from a source processing resource to a target processing resource.

Referring to FIG. 2, a more detailed block diagram illustrating migrating a workload partition is depicted. The first or departure/source system 200 can include local memory 204, a workload partition module (WPAR) 202, a paging device 206, a PmemFS module 210 that can create a transition-translation table 208 based on check point data, and an NFS 212. The arrival/target system 201 can include a workload partition module 214, paging device 218, memory 216, virtual memory module manager (VMM) strategy module 220, that can generate an external page table (XPT) 222, and a remote paging device 224.

The DTP 223 can instruct the WPAR 202 to suspend processing and can instruct the arrival/target system 201 to load an operating system and receive the start-up commands for the application of the mobile WPAR 214. The VMM 220 can, in response to the DTP 223 create the XPT Table 222. The XPT 222 can provide a memory look up feature where the kernel of the arrival/target system 201 can utilize the data in the XPT 222 to find the actual address where the desired data is located.

Remote paging device 224 can access the XPT 222 and in coordination with the NFS server 212 the remote paging device 224 can utilize the "virtual" addresses in the XPT 222 and send the information across the wire via the NFS 212 to PmemFS module 210 that can in turn access the transition-translation table 208 to locate the desired memory locations and data to restart or continue the migrated process. Accordingly, the transition-translation table 208 can be utilized to facilitate migration of the workload by providing a restart position or configuration for processes associated with the workload at the new hardware location (i.e. 201).

Pinned pages that belong to the process to be migrated can be transmitted to the arrival/target system 201 immediately. The rest of the pages can be left in local storage or in virtual memory and can be retrieved later when the arrival/target system 201 creates a page fault and the memory retrieval system locates the page via tables. Pages of memory that have been pinned by a process that is or will be migrating, can be identified immediately and once all of the pinned pages are paged in, the DTP 223 can send control signals to the arrival/target system 201 to restart the processes. After a process is restarted, traditional arrangements could be utilized to retrieve working segments in accordance with traditional remote "page-in" mechanism. Such a process could be a page in process. Once a page has been fetched in, it's mapping to the remote paging device could be deleted in the XPY 222 and thus, all future page-outs could occur via a local paging device.

In some embodiments, a background kernel process can be implemented that retrieves and transports the pages pertaining to the mobile WPAR before the OS and the kernel are shut down on the source system. The background process can monitor what pages have been requested and forwarded to the arrival system before the kernel ceases operation. This feature can attempt to ensure that all pages are transferred to the target in a finite time period. This kernel process exits when there are no more pages on the remote server. Once all the pages have been fetched in, the remote "pseudo" file could be deleted. When the file is deleted, the transition-translation table 208 on the departure/source system 200 can be deleted as well. The pages on the departure/source system 200 do not have to be deleted forcefully. These pages could get deleted when the processes on the departure/source system 200 that belong to the WPAR cease operation and are removed from memory.

The XPT table 222 and the transition-translation table 208 can link an offset location or an index with a segment and a page number. The PmemFS 210 and the remote paging device 224 can utilize the data in the table or the relationship between the segments, page information and the index, and the processes that are associated with the workload can retrieve the desired data and the process can be "recreated" on the arrival/target resource 201. Thus, the arrival/target resource 201 can start execution of the suspended processes at the locations in the instruction code where the processes were suspended or interrupted.

Workload management tool module (WMTM) 219 can partition resources such as servers 200 and 201 in a logical fashion. WMTM 219 can add client logical partitions to a partition a workload group. A partition workload group can be an identity for a set of logical partitions that are located on the same physical system such as arrival/target system 201 and departure/source system 202. WMTM 219 can control WPARs 202 and/or 214 to create, change and facilitate partitioning of workload groups. WMTM 219 can identify logical partitions that can be merged and can identify partitioned workload groups that can be synergistically managed to enhance overall platform performance. WMTM 219 can also ensure that the arrival/target system, such as arrival/target system 201, has the features required to successfully accept and execute a migrated process.

WMTM 219 can operate similar to a product that is commercially available from International Business Machine (IBM®). Such a product is sold as an enterprise workload manager (EWLM). The WMTM 219 can dynamically and automatically redistribute processing capacity within a partition workload group to satisfy workload performance goals. The WMTM 219 can adjust the processing workloads and operating capacity based on calculations that compare the actual performance of a partition in a partition workload group to the business goals defined for the partition, the group or the work.

It can be appreciated that given the amount of code that multiple applications require, moving a workload or a set of processes quickly and efficiently from departure/source system 202 to arrival/target system 201 can be a complex task. It can be appreciated that most traditional mobility arrangements store the "entire data" on a file system that is associated with the mobile WPAR such as on a network file system (NFS) server prior to migration. An NFS generally, is any computer file system that supports file sharing, printer sharing, and other resource sharing as persistent storage that is accessible over a computer network. Persistent storage refers to storage where the characteristic of data outlives the execution of a program that created it such that data resulting from a process is not lost. This is achieved in practice by storing the data in non-volatile storage such as a file system or a relational database or an object database.

In accordance with the present disclosure, data stored by the NFS 212 can be managed by departure/source server 200 and arrival/target server 201 utilizing transition-translation table 208 as part of a storage checkpoint configuration. The storage checkpoint can be created by freezing the state of a primary file system, or the PmemFS, initializing a storage check point's block map and thawing the primary file system possibly stored in virtual real memory VRM 227. Freezing can temporarily block all I/O operations to the file system such that the stored data does not change during the migration process.

In some embodiments, the migration process may have to wait for active or pending I/O operations to the PmemFS 210 to be completed and then the PmemFS 210 can be synchronized to a disk as part of memory 204 at the departure source system 200. After initializing the storage check point's block map or transition-translation table 208 that points to data blocks of the primary file system, the file system can then be "thawed" to allow continued access by any application or operating system that needs to access the file system. As check point data is acquired, the check point data can be written to a remote location such as remote NFS repository 225 by the departure source system 202. Upon restart, the check point data can be located via the tables and can be retrieved and read by the arrival/target system 201 during restoration.

The remote repository 225 can be accessible to both the arrival system 201 and the departure system 201. The migration process does no have to be a two part procedure, as time can be save if the bulk of the code and data associated with it does not have to be sent to the remote repository and then restored before the application on the arrival server 201. In accordance with the process illustrated with reference to FIG. 2 a relatively small amount of data is captured and can be stored by the NFS 212 or transferred directly over the bus interconnect. While a traditional migration processes requires that all of the stack data, heap data, memory map data etc. be saved to a remote repository such as remote repository 225, and/or an NFS server, such as NFS server 212, the disclosed migration process teaches that only indexes or reference information and non-private process data needs to be stored and sent to the arrival/target system 201. In some embodiments, before a migration command is initiated by the DTP 223 it can be determined if the arrival/target system 201 can execute the workload that will be migrated.

Figure 3:
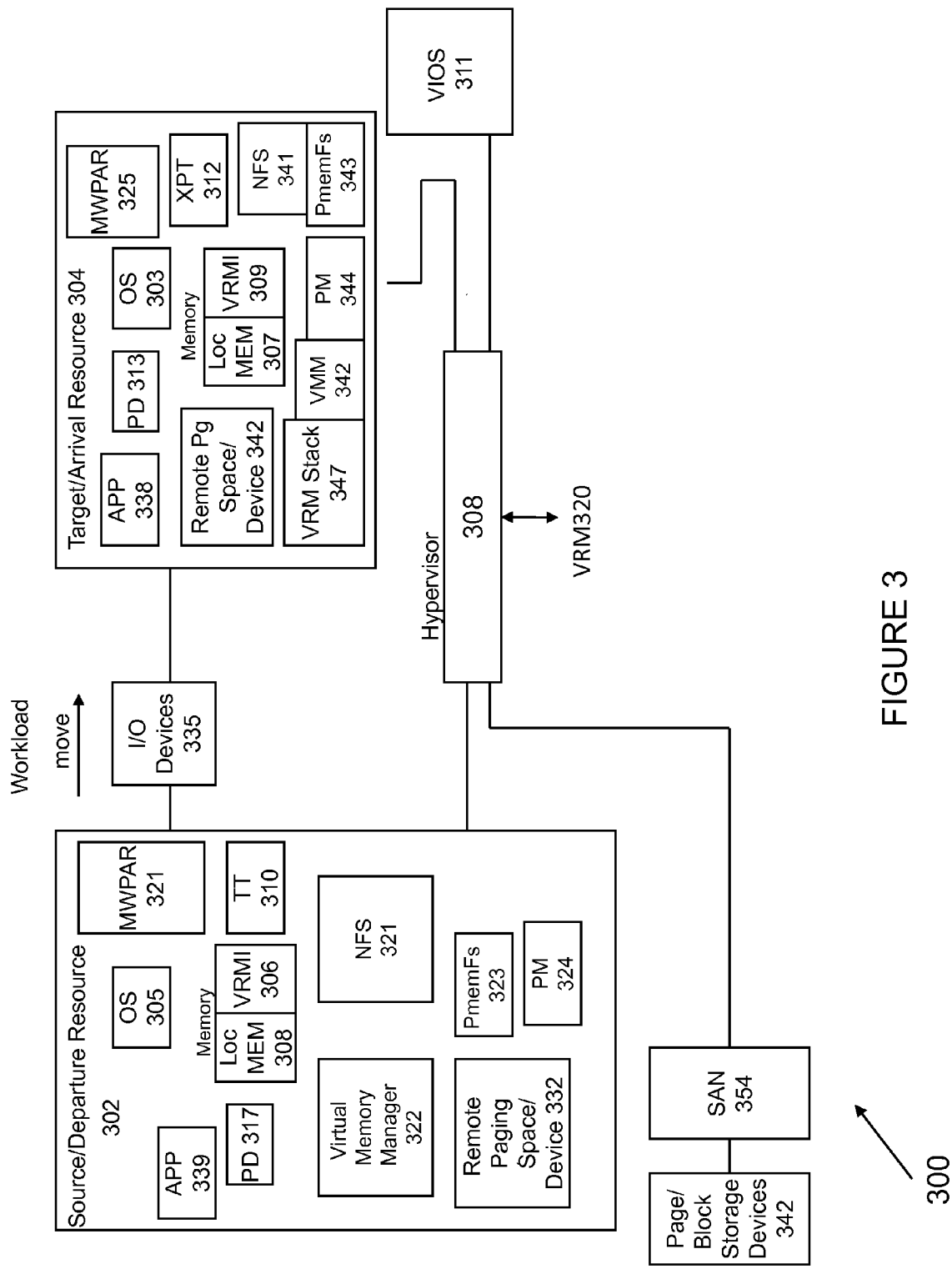
FIG. 3 is a block diagram of a computing system having multiple hardware elements where a workload can be migrated from one element to another element.

Referring to FIG. 3, an enterprise type computing platform 300 is illustrated. The platform 300 can include a hardware such as a user input output (I/O) devices 335, virtual real memory (VRM) 320, hypervisor 308, storage devices 342, storage area network (SAN) 354, and virtual input output server (VIOS) 311. The I/O device 335 can be a simple terminal or it can be a network device or I/O device could be a networked device. I/O devices 335 could include keyboards, pointing devices and a display, to name a few.

The platform can also include source/departure processing resource, or just resource 302, that can have a workload that is migrated to hardware target/arrival processing resource or resource 304. Each of the resources 302 and 304 can include a platform manager (PM) 324 and 344, that can include a meiosis checkpoint restart module, a PmemFS 323 and 343, remote paging space/device 332 and 342, virtual memory manager (VMM) 322 and 342 and networked file system module 321 and 341. Each module drawn inside of the box depicting the resources 302 and 304 are or can be considered as part of the OSs 305 and 303.

The MWPAR 325 can include checkpoint restart tools, maintenance applications and monitors, workload monitoring and management tools, partitioning tools, monitors, etc. Resources 302 and 304 can also include applications (APP) 339 and 338, local paging device (PD) 317 and 313, operating systems (OSs) 305 and 303, mobile workload partition (MWPAR) 321 and 325, user memory or local memory 308 and 307, and virtual real memory interface (VRMI) 306 and 309. Resource 302 can include transition-translation table (TTT) 310 and resource 304 can include external page table (XPT) 312.

In some embodiments OS 304 can be identical to OS 302 in all perspectives and both OS 304 and OS 302 can support the PmemFS. It can be appreciated that a user may want to move the workload back to the source hardware 302 sometime, so both OS's 302 and 304 can have PmemFS capability.

In operation, migration of a workload can be activated automatically by a workload monitoring system such as PM 324 that detects problems with a source/departure system (i.e. 302) and offloads the workload of the platform 300. In some embodiments, the PM 324 can initiate a migration based maintenance schedule where automatic maintenance is periodically performed on the source system 302. In other embodiments, a user via I/O devices 335 can manually command the systems 302 and 304 to perform the migration process. In some embodiments, a user can manually configure which systems are to perform as source systems and which systems are to perform as target systems using the I/O devices 335.

For example, a user could select systems from a list of systems on a graphical user interface as facilitated by I/O devices 335. In some embodiments, target systems or back-up systems can be chosen based on a profile of the system such that, in the event of a failure on a departure resource, a first migration target can be selected, and if the first back up is busy, unavailable or has failed, the PM 324 can communicate with and determine capacities of another possible target system or a second back-up and so on.

In a virtual system or a partitioned system the OS 305 to be migrated will have a kernel or kernel extension that coordinates sharing of resources in coordination with hypervisor 308. Utilizing commands from PM 324 to control source and target kernels during a migration process provides a migration process where only a small amount of data is collected and sent to the arrival server. This small amount of data can include where in the code the execution was interrupted or stopped. For example, the minimal data can include what line of code is the next line to be executed, if the departure system was to continue processing or what line was the last line to be executed.

Such data can include memory locations such as local or actual user memory locations or virtual memory locations. Such data can be utilized by the arrival resource to restart or restore the process on a different piece of hardware (i.e. the arrival server. Such a process can take less that one second. The disclosed arrangements can utilize functions provided by the kernel to assist in the migration of the processes. For example, when a workload is to be migrated to a new system, a small amount of data can be collected regarding the MWPAR processes, what memory location data is desired and then the process can be migrated and, using the memory location data, the application data can be restored and the OS and its applications can be restarted. Such a process can take less that one second.

The VRM 320, paging devices, and systems 302 and 304 can transact (store data to and retrieve data from) block storage devices 342 via SAN 354. Block storage devices 342 can be a paging device, including mass storage devices. Block storage devices 342 could include hard disks or any form of mass storage unit, typically having lower performance read-write times or longer access times than local memory 308 and 307, that can page data however the data can persist. Block storage devices 342 can be remote devices implemented as one or more hard disk, optical disks, flash memory, magneto-optical, tape drums, or holistic memories. Such block storage devices 342 could have removable and non-removable media.

The platform 300 illustrated has only a few of the components needed to provide a comprehensive computing platform. For example, many more processing systems similar to systems 302 and 304 should be available as part of the platform 300. Likewise, multiple OSs 305, applications 339, and MWPARs 325 could exist on each system 302 and 304. Like entities, such as applications 339 and applications 338, can have similar, identical or different operations. Some platforms may not have a VRM 320. To make the disclosed arrangements legacy compliant, an OS, such as OS 305, can detect the presence of a VRM 320. If OS 305 detects a VRM 320, the OS can change its mode of operation to utilize the disclosed features of a virtual real memory (i.e. VRM 320). When no VRM 320 is detected, the OS can operate in accordance with legacy systems.

In operation, system 302 can utilize VRM 320 as its "personal" random access memory (RAM). Thus, VRM 320 can allocate a logical amount of memory to each OS, 305, 303 etc. The VRM 320 can manage the virtual memory with the assistance of firmware (F/W) or hypervisor (HYP) 308. Generally, when the VRM 320 needs physical memory, the virtual memory manager (VMM) 322 can send blocks of memory to block storage devices 342. This process can be referred to as paging.

OS 303 can index pages, blocks, frames, logical volumes, etc., and record such indexing in XPT 312 which can provide a logical address to physical memory location conversion table. VRM 320 can facilitate such a process by transacting in logical volumes/dimensions, blocks, pages, etc., and can be implemented as memory that operates utilizing logical dimensions or volumes such as a page or block of memory. The virtualized memory system VRM 320 can have one or more page table(s) that can be utilized to translate effective address or virtual address to a real address. The OS 305 and/or hypervisor 308 can manage the table to reflect how the OS 305 has allocated memory resources. The XPT table 312 can include tracking functions to track what physical locations are "in use." Such tracking can include tracking of memory locations that are being used by the kernel, the applications 338, the OSs 303 etc., and what physical locations are pinned, in use, idle, storing open files, etc.

In some embodiments, data and/or the results from a computation performed by source system 302 prior to migration can be passed from node to node or system to system via the hypervisor 308 and the PmemFS 323. The transport system can utilize page spacing partitioning to allow systems 302 and 304 to share data.

In some embodiments, check point data can be quickly and securely sent from system 302 to system 304. The migration process can include creating and storing check point data and restart data and parallelizing this data in user space or local memory of the source 308. The check point data can be transferred directly from the departure resource 302 to the arrival resource 304 utilizing the PmemFS 323 and the application process 338 can be restarted utilizing this check point data.

Each user space process can manage its own virtual memory space, and, unless explicitly requested, each process cannot access the memory assigned to other processes. This is the basis for memory protection in today's mainstream operating systems and a building block for privilege separation. Depending on the privileges assigned, processes can request the kernel to map part of another process's memory space to its own, as is the case for debuggers. Programs can also request shared memory regions with other processes.

The PmemFS 323 is generally a file system that can map processes that are actively working in memory in preparation for the migration of a process. The functions provided by the PmemFS 323 can be facilitated by remote paging device 332. The PmemFS 323 can have knowledge of which page in memory is mapped to or associated with each offset or index. The premapping information can be maintained in the physical memory 308 and 307. Pre-mapping can provide a fixed relationship between an index and a memory location. In some embodiments, the PmemFS 323 can be a read-only file system as no new pages can be created on in this memory or device by the hardware or machine that interfaces the PmemFS paging device. Such a read only paging system can provide desired efficiencies in a migration process. The PmemFS 323 can provide a file system that supports a directory structure that is one level deep. Files can be created within each directory or at the root level.

A conventional operating system usually segregates virtual memory into kernel space and user space. Kernel space can be reserved for running the kernel, kernel extensions, and some device drivers. However in most operating systems, memory data utilized by the kernel is not swapped out to a disk and is kept locally. In contrast, user space is a memory area where all user mode applications work and this memory can be swapped out when necessary. The term user memory is often used for referring to operating system software that runs in user space.

The PmemFS can have swap files and the PmemFS's swap files can be created at the root level and swap files can be created under sub directories. The swap files at root level can be exported as NFS 321 compatible files and in legacy versions that do not support export of files directories can be exported. Irrespective of at what level a swap file or dimension of swap data is created, each file in the PmemFS 323 file system can be utilized to create an abstract, mapping the working segments of one or more processes. The files can be exported to the arrival system 304 and the files can be moved via a NFS swap device such as device 332. The table 310 which can be viewed as a disk bit map can be passed to the arrival system 304 and the arrival system 304 can utilize the data in the TT 310 to create a remote page-in map. When the applications 338 loaded and execution begins on the arrival system 304 the desired pages can be fetched from the departure system 302 asynchronously and on demand as needed typically from the VRM 320. The PmemFS 323 can be implemented and operated as part of the kernel of the OSs 305 and 303. The OSs 305 and 303 can have a helper mount command in the user space (local memory) 308 and 307 to mount the file system.

Some of the coding features of the PmemFS 323 allow the PmemFS 323 to seamlessly interface with existing remote paging technologies such as VMM 322 and NFS 321 technology features. In addition pages of data can be brought in by the arrival resource 304 asynchronously on demand and such a feature can ensure that the downtime of an application during the migration process is minimal. The PmemFS 323 can also transact in many different data increments, such as blocks or pages. The PmemFS 323 can increase or decrease the size of data that it utilizes to facilitate transactions and the size of the data for each transaction can grow as big as needed and may only be restricted by max file size of the NFS 321 and the VMM 322. Further, pages can be transferred encrypted and authenticated over the NFS 321 and the memory file transfer system such as the PmemFS 323 can be operated such that it utilizes little if any local memory 307.

Each file in the PmemFS 323 can contain mapping for numerous check pointed processes or for only a single check pointed process as required for migration. The PmemFS compatible files can be created "on-the-fly" during the check point process and the files can be deleted when "all" the pages, files etc., have been transferred to the arrival system 304 and the migration is determined successful. Each file processed by the PmemFS 323 can have a unique name and can be backed internally to the TT node 310 in local memory 308. The TT 310 can be linked to the list of such nodes in local memory 308. The TT 310 can provide a "one-to-one" correspondence or association between a node in the linked list and the file. Each node can include a pointer to direct, indirect and double indirect for transition-translation table entries.

In some embodiments, the TT 310 can store 1024 entries and each entry can contain a virtual segment number (vsid) and page number (pno). Each node can also store the last offset for convenience, the vnode pointer, and such data can be serialized through a complex lock. Prior to the migration, the PmemFS file 323 can be created on the departure system 302 and the transition-translation table node can also get created and associated with the PmemFS file 323. As processes or applications 339 to be migrated are check pointed, segments and page numbers (pnos) of the applications 339 can be added to the TT 310 using application programming interfaces (APIs). Generally the APIs can be a set of functions that can be called from an application program to access features of other programs. The index or offset in the TT 310 at which the segment and pno is added can be returned to the caller. The segment, page number and the offset can be passed to the arrival system 304 along with other check point data. The migrated processes or applications 338 can be recreated with their pages marked as "paged out" to a remote file system such as NFS 321. When the processes 338 are resumed, the pages can be resolved utilizing page fault indicators in accordance with VMM commands and NFS commands.

In some embodiments, a page fault request can be sent out via the VRMI 309. The page fault can contain the file handle or file name and the offset value. The PmemFS_file module 323 can read the offset, and utilize the offset as an index to obtain the segment and the page number information for the missing data.

The PmemFS module 323 can then attach the segment at the page offset and read a page worth of data and send the data back to the target server 304. Future page outs from the departure source 302 can occur on a local paging device, as the PmemFS module 323 can become inactive. In some embodiments, the PmemFS module 323 can be utilized exclusively for the migration of processes and thus, can be idle when no migration is occurring. When the migration process is completed and all the pages are fetched in, the paging device 332 can be deactivated and the PmemFS files 323 can be removed from the departure resource 302. While a process is migrating the contents of the paging device 317 can be kept in frozen state on the departure resource 302. This freezing process can ensures that the segment and page number of the departure resource 302 does not get altered prior to or during the paging operation of the "state of the process" data transfer.

The disclosed migration process and the PmemFS 323 can be controlled by and can utilize functions that are provided by the kernel of the departure OS 305 and the arrival OS 303. The migration process can be monitored and managed by a checkpoint restart manager of the PM 324. When multiple OSs are operating on each resource 302 and 304, each kernel can coordinate the sharing of platform resources with the hypervisor 308. Generally, the kernel is at the heart or core of the OSs 305 and 303 and the kernel can have the primary function of controlling the execution of processes or applications including, handling memory management, providing a file system, and providing a portable interface through which programs can communicate with hardware.

The disclosed arrangements can improve the overall performance of a computing system, such as a data center or a cluster configuration, by efficiently moving workloads from hardware resource to hardware resource upon request. Thus, an application that manages processing workloads can generate a workload migration request or a user can generated such a request and the disclosed arrangement can efficiently facilitate such a request.

Workload migration can include moving and all of its applications as one unit. Such a move can allow an administrator to avoid many of the difficulties faced by process-level migration approaches. In particular, the narrow interface between a virtualized OS and the virtual machine monitor (VMM) can assist in avoiding the problem(s) associated with residual dependencies' in which the original host machine must remain available and network-accessible in order to service certain system calls or even memory accesses on behalf of migrated processes.

With the disclosed virtual machine migration, the original host or the source departure resource 302 can be decommissioned and powered down once migration has completed. This can be particularly valuable when migration is occurring in order to allow maintenance of the original source. In addition, migrating at the level of an entire virtual machine allows the in-memory state to be transferred from machine to machine in a consistent and efficient fashion. The disclosed workload migration applies to kernel-internal state (e.g. the transport control protocol (TCP) control block for a currently active connection) as well as application-level state control, even when control is shared between multiple cooperating processes.

The disclosed migration process and hardware can be accomplished on the fly or while applications are in the middle of processes without noticeable interruption of service to users. For example, an administrator of a server farm that is supporting on-line games or virtual environments for many users throughout the world, can migrate one or more of the processes in an on-line game server or streaming media server without disconnecting clients and without requiring clients to reconnect due to the migration. This seamless migration was not possible with approaches which use application level restarts and layer seven redirection, as defined by the open standards interconnect model. The disclosed live migration from virtual machine to virtual machine allows a separation of concerns between the users and operator of a data center or cluster.

In some embodiments, the pages associated with the page information can be marked or tagged as virtual pages on a remote disk and such an association can provide a link to locate the data during the restart. When restarted, the applications page fault and pages of data can utilize a NFS swap function, procedure or device to page the data in memory on the arrival server or target server when needed.

Thus, kernel can enable check points and other organizational tools that allow the processes of a workload to be restarted after the workload is migrated to the target server. The disclosed migration process is faster and more efficient than traditional migration arrangements which require bulk transfers and other cumbersome processes and overhead.

It can be appreciated that check pointing is a relatively fast process and utilizing page information or paging to restart processes makes the migration process more efficient because the restart process is much more efficient. Accordingly, the disclosed arrangements significantly reduce the downtime required for workload migration. After the processes associated with the workload are restarted, the processes can request and retrieve pages of data based on the checkpoints from the virtual memory as the processes need such pages.

The features described herein can be utilized in cooperation with an AIX 6.0 workload partition (WPAR) application. Generally the disclosed arrangement can interlock or integrate existing remote paging features such as those provided by a virtual machine manager (VMM) and file transaction technology. For example, an NFS can provide such file transaction features or technology. In some embodiments, the VMM can service or manage memory services for a large numbers of virtual servers, particularly a source server and a target server where the workload can leave the source server and move to the target server. Generally, the VMM can also provide for increased physical server utilization of memory by making possible simple and fast consolidation of memory functions utilizing a virtual infrastructure.

Accordingly, the workload migration arrangements disclosed herein can perform workload migration and during such workload migration standard VMM commands (like mkps, rmps, swapon, swapoff, etc.) can be utilized to perform memory operation. The disclosed arrangements can also make use of "virtual paging space" to store and retrieve data pages. In some embodiments, pages of data can be demanded and retrieved in an asynchronous mode.

Swapping and transferring pages utilizing virtual memory allows for minimal application downtime during the workload migration process. The migration process can also support pages of different sizes or multi-size pages. The disclosed arrangements can utilize the NFS protocol which is a stable protocol when compared to the wire transfer protocol. The disclosed arrangements can take advantage of advanced NFS control features like Kerberos authentication and encryption. In addition, pages can be encrypted, transferred and authenticated via the NFS.

Figure 4:
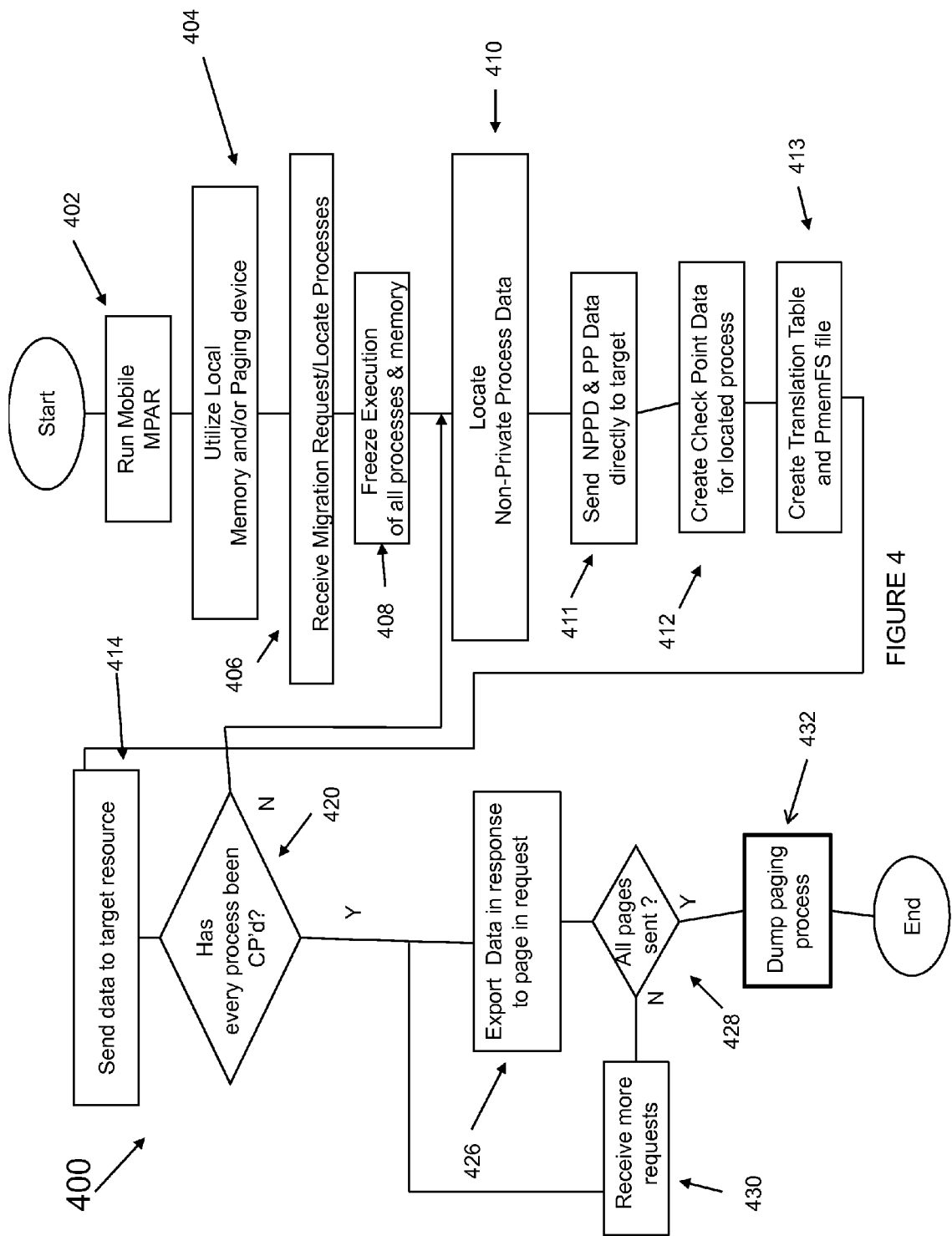
FIG. 4 is a flow diagram depicting a method for migrating a workload from a source.

Referring to FIG. 4 a flow diagram for a migration process is disclosed. As illustrated by block 402, a mobile logical partition MPAR can be run on a hardware resource. The MPAR can include one or more operating systems running one or more applications or processes. As illustrated by block 404, the MPAR can utilize local memory and a paging device during operation. As illustrated by block 406, the hardware running the MPAR can receive a migration request and can locate all processes to be migrated. The operating system operation, some memory functions, and the processes can be frozen, as illustrated by block 408. Some processes may be allowed to continue operating until they reach an orderly place in the execution to perform a shut down or a interrupt, thus, making it easier to migrate the process.

As illustrated by block 410, non-private process data (NPPD) can be located. As illustrated by block 411, NPPD, and pinned pages or meta data on pinned pages can be sent directly to the target via a network connection. As illustrated by block 412, check point data for located processes can be created. A translation table with segments and page numbers and one or more PmemFS files can be created and the translation table, NPPD and the PmemFS files can be associated, as illustrated in block 413.

In some embodiments, if the segment and page number information for the processes' working segment is added to the translation table, the offset at which the segment and page number can be added and the segment and page number can be passed to the arrival server along with other information such as whether the page is pinned or not pinned. Check point data can be sent to target resource, as illustrated by block 414.

Generally, at block 414, the abovementioned data associated with the mobile process can be sent to the target resource and the target resource can begin a restart process utilizing this "minimal" data. Once this data including pinned pages, table and non-private process data are loaded on the target server, the process can be restarted on the target server and execution of the processes can continue where it left off on the departure resource.

As illustrated by decision block 420, it can be determined if every process has been checkpointed. If there are processes that have not been checkpointed, the process can revert to block 410 where more data can be located. If every process has been check pointed, then the method can move to block 426 where the departure resource can await commands from the kernel of the target system for more data.

Generally, pinned pages are typically treated as page-ins that are frequently utilized by the application or the OS. Generally pinned pages are not sent to a paging device and thus pinned pages typically remain in local memory. In some embodiments there is no special handling of the pinned pages on the departure resource. Thus, pinned pages are typically required to be present on the arrival resource before the process is resumed. Data including pinned pages can be transmitted to the target server in response to page in request from the target server, as illustrated by block 426. As illustrated in decision block 428, it can be determined of all pages have been sent. If some of the pages have not been sent, the departure system can await and receive more requests as illustrated by block 430. If all pages have been sent the paging process or migration process can be dissolved or dumped and the source system can be powered down without affecting operation of the platform.

Referring to block 432, in some embodiments the kernel at the arrival system and the source system can track the amount of pages that a process has migrated. The pages that have been sent can be accounted for and it can be determined if additional pages need to moved to the target system before the migration is complete. Periodically, the kernel of the arrival system can send paging request until no pages remain in the source paging device. Clearing out the memory on the departure side that contains data related to the migrated process can be done by a background kernel process which retrieves or moves the pages which have not been referenced or retrieved by the restarted process.

Thus, if untouched pages exist on the source machine the pages can be sent to the target device as requested by the kernel process of the target machine. When all pages have been sent, the process can end as the paging device can cease operation after all pages have been sent to the target system. Generally, after decision block 426 the target server can restart the frozen process after the process is "re-created" on the target machine. Referring back to block 426 requested files such as the PmemFS files can be exported to the arrival machine. Sometimes files pages data etc can be requested by the target machine. Accordingly, the departure machine can wait for page-in requests and act accordingly. When all the pages have been sent across, as determined by an inventory of which pages have been transferred to the target resource, the PmemFS file and translation table can be deleted from the paging device or the source system and the migration processes on the departure server can expire.

Figure 5:
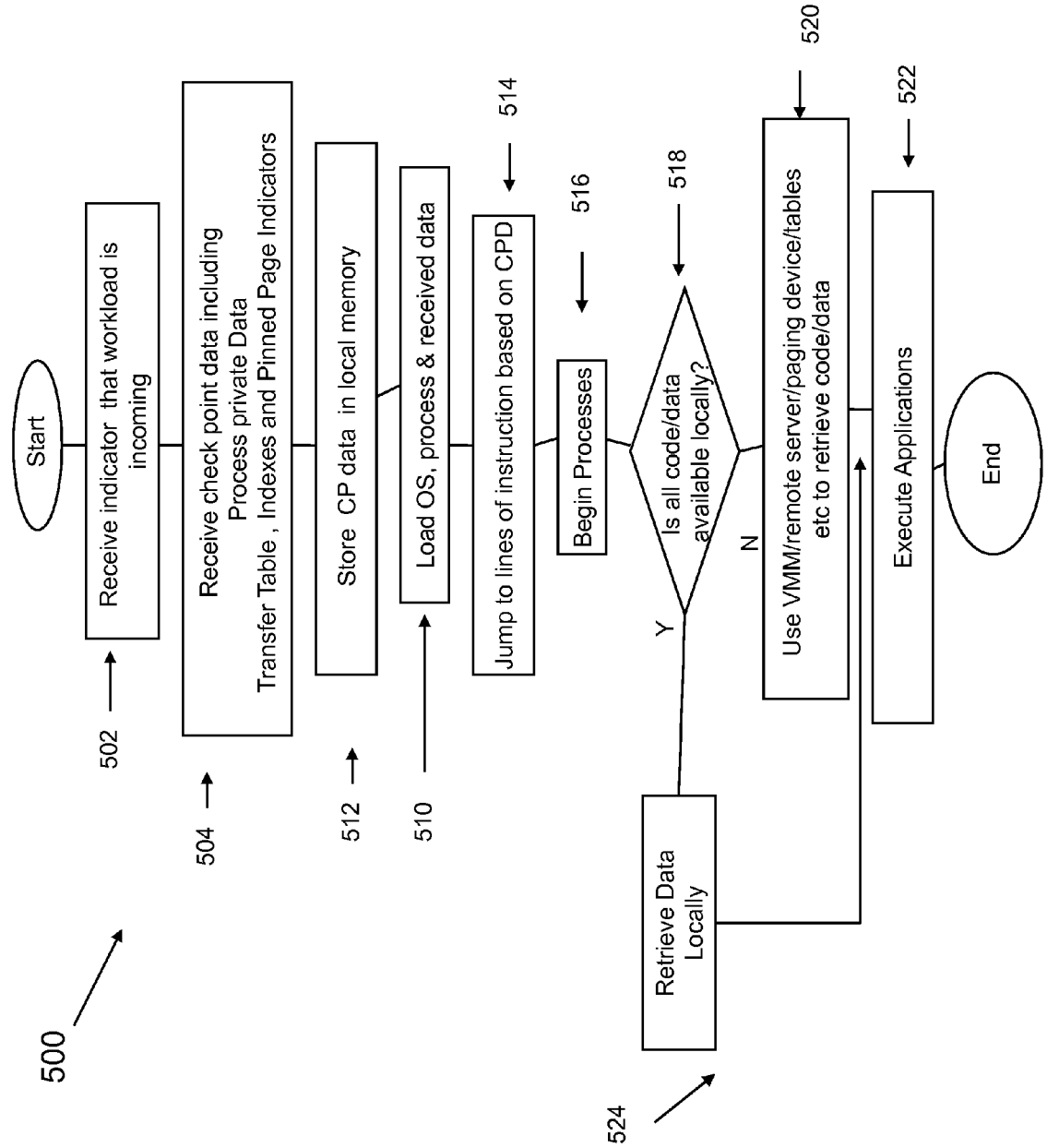
FIG. 5 is a flow diagram of illustrating a method for restarting a migrated workload.

Referring to FIG. 5, a flow diagram of a migration process is depicted. As illustrated by block 502, a target server can receive an indicator that a workload is being restarted. As illustrated by block 504, check point data can be received by the target server. A remote paging device can be created. The checkpoint data can include non-private process data (i.e., segment, page number offset pinned etc) a transfer table having indexes and pinned pages. The check point data can be stored in local memory of a paged memory, as illustrated by block 512. The process checkpoint data is used to create the process and the external page table in VMM for this process is marked paged to the remote paging device.

As illustrated by block 510, the appropriate operating system data relevant to the MWPAR is restored and applications or processes can be loaded as explained above. The processes of the target server can load data and load specific instructions based on the check point data such that the application knows where to restart the process. Thus, the target server can jump to specific lines of code or instructions in response to the received check point data, as illustrated by block 514.

The processes can begin, as illustrated by block 516. As illustrated by block 518, it can be determined if all code and data needed for execution is locally available. If the data is available locally the data can be retrieved locally as illustrated by block 524. If the data in not available locally, then a page fault can be set and a hypervisor and a virtual memory manger can be queried with the check point data and the needed data can be retrieved, as illustrated by block 520. The applications can be executed as illustrated by block 522 and the process can end thereafter.

When all the pages have been requested and sent the remote swap device at the source can be removed from operation. It can be appreciated that a background kernel process can be the mechanism that requests and receives data. Apart from fetching the pages from a remote server via asynchronous commands or demand controls the background kernel process of the target server can touch or request and retrieve all pages that pertain to or are associated with the mobile WPAR or the processes to be moved. Such a retrieval can be achieved at a generally steady rate such as to not congest data traffic in the platform. In some embodiments this asynchronous data transfer can ensure that all needed data is transferred in a particular amount of time. The source system can send out data to the target system on a periodic basis such as not to congest traffic but to get all of the data moved to the new location in a reasonable amount of time or a finite amount of time so that the source system can be removed from service. The background kernel process can exit when a page count has been reduced to zero on a remote server indicating that all pages have been transferred to the destination as no more needed pages are being stored on the remote server.

Embodiments may take the form of an entirely hardware embodiment, an entirely software embodiment or an embodiment containing both hardware and software elements. An embodiment that is implemented in software may include, but is not limited to firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printdrs!or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

The invention claimed is:

1. A method comprising:

receiving a command to migrate a workload from an active processing resource to a target processing resource, wherein the active processing resource has a first allocated memory and the target processing resource has a second allocated memory;

interrupting the execution of a process on the active processing resource in response to the command, the process utilizing data in memory locations in the first allocated memory during the interrupting;

freezing activity on the memory locations in the first allocated memory in response to the command;

generating checkpoint data to restore the process;

automatically transmitting the checkpoint data and only a small portion of the data in the memory locations from the first allocated memory to the second allocated memory, wherein the small portion of the data the memory locations of the first allocated memory is a portion less than all of the data in the memory locations utilized by the process in the first allocated memory;

restarting the execution of the process on the target processing resource utilizing the small portion of the data in the memory locations resident in the second allocated memory;

responsive to the execution of the process on the target processing resource attempting to access data failing to be in the small portion of the data in the memory locations in the second allocated memory thereby forming additional data, utilizing the checkpoint data to identify a location of the additional data in the first allocated memory; and transmitting the additional data from the first allocated memory to the second allocated memory for utilization by the target processing resource.

2. The method of claim 1, wherein transmitting the checkpoint data comprises:

transmitting an indicator of pinned pages stored in the first allocated memory over a network.

3. The method of claim 1, wherein transmitting the checkpoint data comprises:

transmitting non-private process data stored in the first allocated memory over a network.

4. The method of claim 3, wherein the non-private process data is one of a data process tree, file descriptor information, TTY compatible data, or STREAMS.

5. The method of claim 1, wherein the checkpoint data comprises indexes and wherein the method further comprises:

pre-mapping one or more of the indexes to one or more memory locations in the first allocated memory of the active processing resource.

6. The method of claim 1, further comprising:

utilizing a network file transport system to move the data over a network.

7. The method of claim 1, further comprising:

utilizing a remote paging device to provide the data to the target processing resource.

8. The method of claim 1, further comprising:

monitoring the data stored in the first allocated memory of the active processing resource that has not been transmitted to the second allocated memory in the target processing resource; and periodically transmitting the data that has not been transmitted from the first allocated memory of the active processing resource to the second allocated memory in the target processing resource.

9. A computer program product comprising a computer readable storage medium having instructions stored therein, wherein the instructions, when executed by a computing device, cause the computing device to:

receive a command to migrate a workload from an active processing resource to a target processing resource, wherein the active processing resource has a first allocated memory and the target processing resource has a second allocated memory;

interrupt the execution of a process on the active processing resource in response to the command, the process utilizing data in memory locations in the first allocated memory during the interrupting;

freeze activity on the memory locations in the first allocated memory in response to the command;

generate checkpoint data to restore the process;

automatically transmit the checkpoint data and only a small portion of the data in the memory locations from the first allocated memory to the second allocated memory, wherein the small portion of the data the memory locations of the first allocated memory is a portion less than all of the data in the memory locations utilized by the process in the first allocated memory;

restart the execution of the process on the target processing resource utilizing the small portion of the data in the memory locations resident in the second allocated memory;

responsive to the execution of the process on the target processing resource attempting to access data failing to be in the small portion of the data in the memory locations in the second allocated memory thereby forming additional data, utilize the checkpoint data to identify a location of the additional data in the first allocated memory; and transmit the additional data from the first allocated memory to the second allocated memory for utilization by the target processing resource.

10. The computer program product of claim 9, wherein the instructions further cause the computing device to:

transmit an indicator of pinned pages stored in the first allocated memory over a network.

11. The computer program product of claim 9, wherein the instructions further cause the computing device to:

transmit non-private process data stored in the first allocated memory over a network.

12. The computer program product of claim 9, wherein the instructions further cause the computing device to:

index the memory locations utilizing a pre-mapped memory configuration.

13. A system comprising:

a processor; and a memory coupled to the processor, wherein the memory comprises instructions which, when executed by the processor, cause the processor to:

receive a command to migrate a workload from an active processing resource to a target processing resource, wherein the active processing resource has a first allocated memory and the target processing resource has a second allocated memory;

interrupt the execution of a process on the active processing resource in response to the command, the process utilizing data in memory locations in the first allocated memory during the interrupting;

freeze activity on the memory locations in the first allocated memory in response to the command;

generate checkpoint data to restore the process;

automatically transmit the checkpoint data and only a small portion of the data in the memory locations from the first allocated memory to the second allocated memory, wherein the small portion of the data the memory locations of the first allocated memory is a portion less than all of the data in the memory locations utilized by the process in the first allocated memory;

restart the execution of the process on the target processing resource utilizing the small portion of the data in the memory locations resident in the second allocated memory;

responsive, to the execution of the process on the target processing resource attempting to access data failing to be in the small portion of the data in the memory locations in the second allocated memory thereby forming additional data, utilize the checkpoint data to identify a location of the additional data in the first allocated memory; and transmit the additional data from the first allocated memory to the second allocated memory for utilization by the target processing resource.

14. The system of claim 13, wherein the instructions to transmit the checkpoint data further cause the processor to:
   transmit an indicator of pinned pages stored in the first allocated memory over a network.

15. The system of claim 13, wherein the instructions to transmit the checkpoint data further cause the processor to:
   transmit non-private process data stored in the first allocated memory over a network.

16. The system of claim 15, wherein the non-private process data is one of a data process tree, file descriptor information, TTY compatible data, or STREAMS.

17. The system of claim 13, wherein the checkpoint data comprises indexes and wherein the memory comprises instructions which further cause the processor to:
   pre-map one or more of the indexes to one or more memory locations in the first allocated memory of the active processing resource.

18. The system of claim 13, wherein the memory comprises instructions which further cause the processor to:
   utilize a network file transport system to move the data over a network.

19. The system of claim 13, wherein the memory comprises instructions which further cause the processor to:
   utilize a remote paging device to provide the data to the target processing resource.

20. The system of claim 13, wherein the memory comprises instructions which further cause the processor to:
   monitor the data stored in the first allocated memory of the active processing resource that has not been transmitted to the second allocated memory in the target processing resource; and
   periodically transmit the data that has not been transmitted from the first allocated memory of the active processing resource to the second allocated memory in the target processing resource.

* * * * *